(12) United States Patent
Zhao et al.

(10) Patent No.: US 9,646,194 B2
(45) Date of Patent: May 9, 2017

(54) METHODS AND SYSTEMS FOR ANALYSIS OF FIBERS AND BRANCHING STRUCTURES WITHIN AN IMAGE OF A SAMPLE

(71) Applicant: Molecular Devices, LLC, Sunnyvale, CA (US)

(72) Inventors: Ting Zhao, Changzhou (CN); Dihui Hong, Chester Springs, PA (US); Avrum I. Cohen, Downingtown, PA (US)

(73) Assignee: Molecular Devices, LLC, Sunnyvale, CA (US)

( * ) Notice: Subject to any disclaimer, the term of this patent is extended or adjusted under 35 U.S.C. 154(b) by 116 days.

(21) Appl. No.: 14/423,285

(22) PCT Filed: Aug. 28, 2013

(86) PCT No.: PCT/US2013/057106
§ 371 (c)(1),
(2) Date: Feb. 23, 2015

(87) PCT Pub. No.: WO2014/036153
PCT Pub. Date: Mar. 6, 2014

(65) Prior Publication Data
US 2015/0213301 A1    Jul. 30, 2015

Related U.S. Application Data

(60) Provisional application No. 61/693,901, filed on Aug. 28, 2012.

(51) Int. Cl.
*G06K 9/00* (2006.01)
*G06T 7/12* (2017.01)
(Continued)

(52) U.S. Cl.
CPC ....... *G06K 9/00134* (2013.01); *G06K 9/0014* (2013.01); *G06K 9/00147* (2013.01);
(Continued)

(58) Field of Classification Search
CPC ........... G06K 9/00127; G06K 9/00124; G06K 9/00134; G06K 9/0014; G06K 9/00147;
(Continued)

(56) References Cited

U.S. PATENT DOCUMENTS 7,136,518 B2 * 11/2006 Griffin ................. A61B 5/0059
345/629
7,282,723 B2 * 10/2007 Schomacker ........ A61B 5/0059
250/458.1

(Continued)

FOREIGN PATENT DOCUMENTS

WO    2007036859    4/2007

OTHER PUBLICATIONS

International Search Report from International Patent Application No. PCT/US2013/057106, issued on Dec. 11, 2013.

*Primary Examiner* — Amir Alavi
(74) *Attorney, Agent, or Firm* — Bella Fishman

(57) ABSTRACT

A computer-implemented method and system perform efficient and accurate fiber morphology analysis of fiber-containing biological samples. The images of objects comprising fiber and/or branching structure are obtained by camera and/or other imaging devices. Initial tracing seeds are obtained by variable modules. The adaptive threshold method is utilized for identifying tracing seeds candidates by local Principal Component Analysis (PCA) calculation and sorting out the seeds with low and high score. Each single fiber segment of interest is traced repeatedly utilizing PCA fitting calculation, and individual fiber segments are assembled by performing crossover matching calculation.

13 Claims, 7 Drawing Sheets

(51) Int. Cl.
*G06T 7/162* (2017.01)
*G06T 7/181* (2017.01)
*G06T 7/136* (2017.01)

(52) U.S. Cl.
CPC ................ *G06T 7/12* (2017.01); *G06T 7/136* (2017.01); *G06T 7/162* (2017.01); *G06T 7/181* (2017.01); *G06T 2207/10056* (2013.01); *G06T 2207/30024* (2013.01)

(58) Field of Classification Search
CPC ......... G06T 7/0012; G06T 2207/30024; G06T 2207/10056; G01N 15/1474
See application file for complete search history.

(56) References Cited

U.S. PATENT DOCUMENTS

| | | | |
|---|---|---|---|
| 8,478,389 B1* | 7/2013 | Brockway | A61B 5/7203 600/509 |
| 8,515,171 B2* | 8/2013 | Vantaram | G06T 7/0081 382/164 |
| 2008/0310674 A1 | 12/2008 | Modiano et al. | |
| 2010/0142751 A1 | 6/2010 | Hirose | |
| 2011/0225680 A1 | 9/2011 | Cope | |
| 2011/0243403 A1 | 10/2011 | Mizuno | |
| 2014/0122039 A1* | 5/2014 | Xu | G06K 9/6232 703/2 |
| 2015/0213301 A1* | 7/2015 | Zhao | G06K 9/00147 382/133 |

\* cited by examiner

METHODS AND SYSTEMS FOR ANALYSIS OF FIBERS AND BRANCHING STRUCTURES WITHIN AN IMAGE OF A SAMPLE

RELATED APPLICATIONS

This application claims the benefit of U.S. Patent Application Ser. No. 61/693,901, filed Aug. 28, 2012, the content of which is incorporated by reference herein in its entirety.

FIELD OF THE INVENTION

This invention relates to image analyzing technology and, more particularly, to analyzing images comprising fibers and branched tubular structures.

BACKGROUND

Fiber structures are common in material science images, biological and biomedical images; such structures include various engineered fibers, bronchial tree, as well as cytoskeleton and neuronal network. A high volume data of acquired images is used to analyze the connectivity and functionality of these structures. Reliable interpretation and analysis require accurate quantitative measures.

However, extracting useful information accurately and rapidly is challenging because of the variety of imaging conditions and complexity of the structures. Images from different sources can have different noise or uneven background intensities, which eliminates the possibility of having a reliable method of extracting fibers without considering local shape properties of the fibers. In the case of neurites the fibers become smaller and significantly dimmer when they are extended away from the cell, causing most algorithms to produce result with poor quality.

Additionally, it may be a large number of fibers in an image implying that the efficiency of local fiber shape estimation is critical for the processing speed. In the biomedical field, detection of fibers can be more difficult than common engineering material because the image of the tubular structures can be a 2D projection of 3D structures intersecting and branching through the cell.

Therefore a need exists for a method providing highly efficient estimation of local fiber shapes and system therefor, allowing for automated fiber tracing that would meet the accuracy and speed requirements of practical applications.

SUMMARY

A computer-implemented method and systems for fiber analysis and reconstruction of a fiber-containing biological sample are provided. Adaptive threshold method is used for obtaining initial tracing seeds. Local Principal Component Analysis (PCA) calculation is utilized for identification of tracing seeds candidate by removing the seeds data with low score from the initial calculation followed by a single fiber segment tracing performance.

A single or individual fiber segment tracing procedure comprises the steps of selecting the seeds that best match the fiber characteristics within a surrounding area. These characteristic may be identified from shape, intensity (brightness), color or other distinguishing characteristic. Then determining the rectangle that would most closely match to local fiber image at a given location, and expanding the rectangle by moving the seed along the direction of an axis of the rectangle. This individual fiber segment tracing procedure is performed for each selected tracing seed candidate. The individual fiber segments are assembled into complete fiber objects connections of which are performed by crossover matching calculation.

After initial fiber identification procedure, fiber sections are connected together. The connections are based on proximity, similarity and rules of connectivity. The connection procedure identifies the fibers that cross each other and/or as branching network. The fiber segmentation may be refined by information in the connectivity or additional analysis maybe be performed to adjust the connectivity.

A system for analysis and reconstruction of fibers and branching structures is also provided. The system comprises an object having fibers and for branching structures; a device for collecting images of the object and various modules for identifying and measuring the object. The modules are operable to obtain initial tracing seeds by performing a threshold method. Tracing seeds candidate is identified by employing Principal Component Analysis calculations, Seeds with low score that were obtained from the initial calculation are removed and a single fiber segment tracing is performed.

A single fiber segment tracing is performed by fiber detection and tracing module, which is operable to select a seed having the lowest noise on a digital image, to calculate the rectangle which at the most matches with the local fiber image at given location, to grow the rectangle by moving the seed along the rectangle axis direction followed by PCA fitting calculation. The fiber detection and tracing module is operable to perform the fiber segment tracing operations until all the candidates are traced and identification of cell bodies in the image is performed. Connectivity model is operable to perform assembling of individual fiber segments and form final network of the neurons in the image.

All aspects of the system may be applied to 3D images. These 3D images can be a set of 2D images collected at selected depth from the sample through a process known as optical sectioning. These 3D images can also be a set of 2D medical images produced by ultrasound, CT, MRI or PET scans.

DETAILED DESCRIPTION

The system and method described may be used to trace and reconstruct fiber structures from digital images (microscopy image as well as medical images like magnetic resonance imaging (MRI)).

Figure 1:
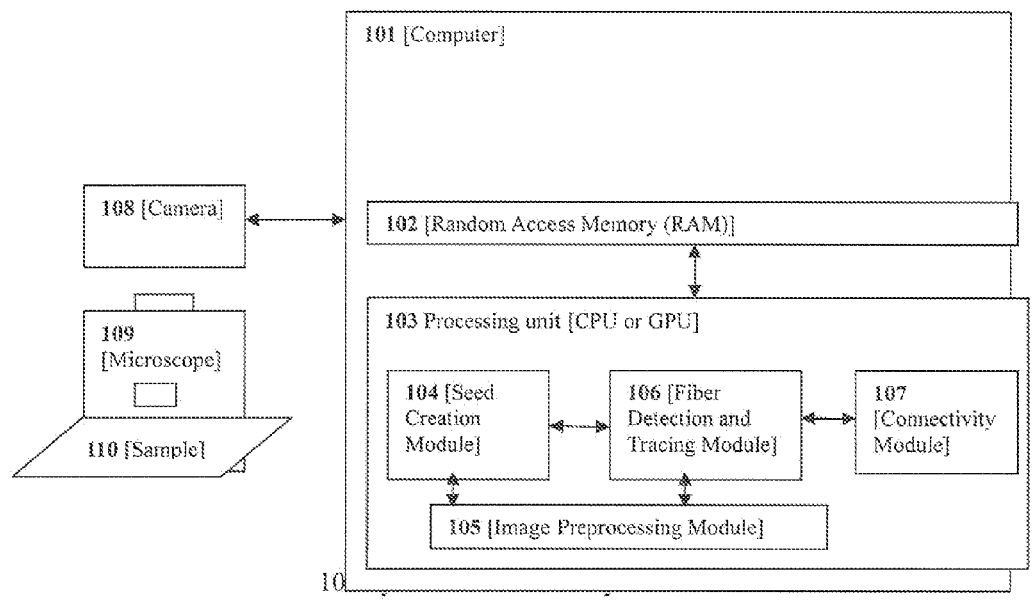
FIG. 1 is an example of an implementation of a system for analysis of fibers and branching structures

Referring to FIG. 1, an example of an implementation of a system for a fast and an accurate analysis of biological samples comprising fibers and/or branching structures is shown. A system 100 includes various modules used to identify and measure objects in a digital image. Images are collected from a sample 110 typically viewed through a microscope or medical imaging system 109. An image is collected with a camera 108 or similar devices such as confocal microscope scanning PMT. The image is provided to a computer 101. The image may be directed to the computer directly, may be stored on storage media or passed through intermediate distribution network such as the internet. The image data is stored in RAM memory 102 and the data is accessed by processing units 103. Instructions to process are provided by Seed Initialization Module 104, and then by Fiber Detection and Tracing Module 106. Output of these functions is used by Image Preprocessing Module 105 operable to deny or enhance the image. Instructions for reconstruction of fiber are provided by the Connectivity Module 107.

Figure 2:
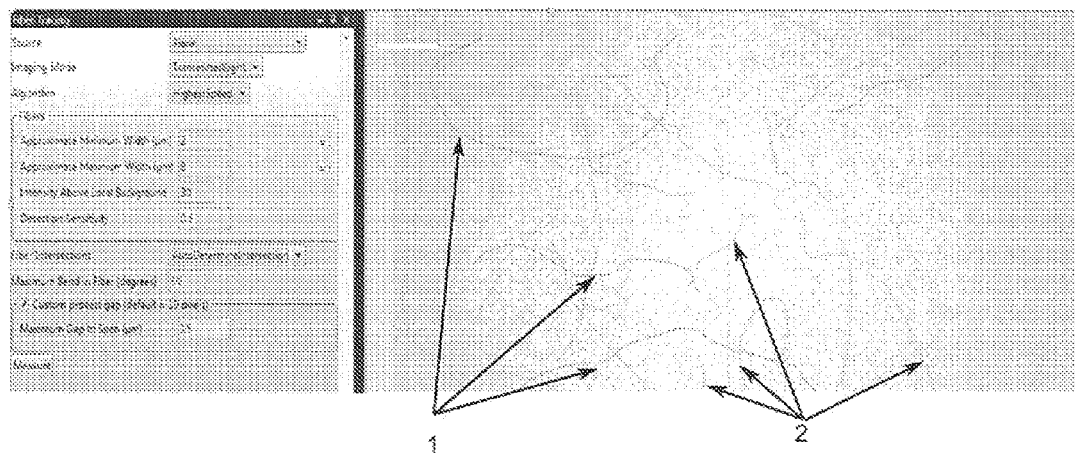
FIG. 2 is an example of an output image obtained with the system for analysis of fibers and branching structures by performing the computer-implemented method for fiber tracing and reconstruction images of the present invention.

Referring to FIG. 2, an output image of the biological sample with the fiber structures obtained by utilizing the system of the present invention is shown. The screenshot provides data on fiber detection that user can obtain. The data being directed to the module allows for determining the characteristics of the fiber and produce optimal result. The image display shows all identified fibers as 1 (or if shown in color, for example, green) as well as several individual fibers as 2 (or if shown in color, for example, orange) that have been reconstructed and determined to be passing across other fibers within the image.

Figure 3:
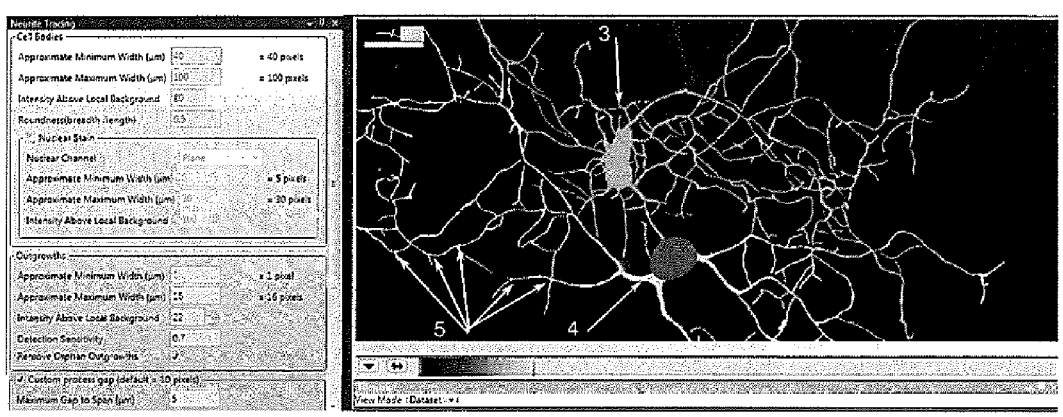
FIG. 3 is an example of an output image obtained with the system for analysis fibers and branching structures by performing the computer-implemented method for neurite tracing.

Referring to FIG. 3, an output image of the biological sample comprising branching structures for tracing obtained by utilizing the system of the present invention is shown. Though a plane view is presented as an example, the invention may apply to a 3D view as well. The screenshot provides data that user can apply for tracing of neurons. Users can usually get more optimal results by setting inputs parameters tailored to the characteristics of the neuron. The image displays identified neurons as 3 and 4 (or if shown in colors, for example, orange and multi colored respectively). Neurites fibers are identified. Fiber branches points are identified as 5 (if shown in color, for example, yellow.) Each fiber section is assigned to the correct cell based on the branching and connectivity.

The output images of FIGS. 2 and 3 were acquired by using principal component analysis (PCA). PCA is used to estimate the image space to characterize the statistics of local shapes, which are rectangles for the subject analysis. PCA can provide the orientation and size of the rectangle with one round of calculation, which is substantially faster than the conventionally used template matching method for tracking objects or patterns for search in the input image data. (A. Can, H. Shen, J. N. Turner, H. L. Tanenbaum, and B. Roysam (1999), "Rapid automated tracing and feature extraction from live high-resolution retinal fundus images using direct exploratory algorithms," IEEE Transactions on Information Technology in Biomedicine, vol. 3, no. 2, pp. 125-138.)

A conventional strategy of tracing fibers shown in flowchart of FIG. 3 is based on currently practiced state-of-the-art methods, which identify candidate seeds and then grow each seed with a progressive fitting. (Zhao T., Xie J., Amat F., Clack N., Ahammad P., Peng H., Long F., Myers E. (2011). Automated reconstruction of neuronal morphology based on local geometrical and global structural models. Neuroinformatics 9, 247-261.

According to the present invention PCA is used for seed initialization (FIG. 5) and seed tracing (FIG. 6) that allows for reducing significantly the computational time. After obtaining a set of individual fiber fragments they can be assembled to form individual fiber object or tree structure.

Figure 4:
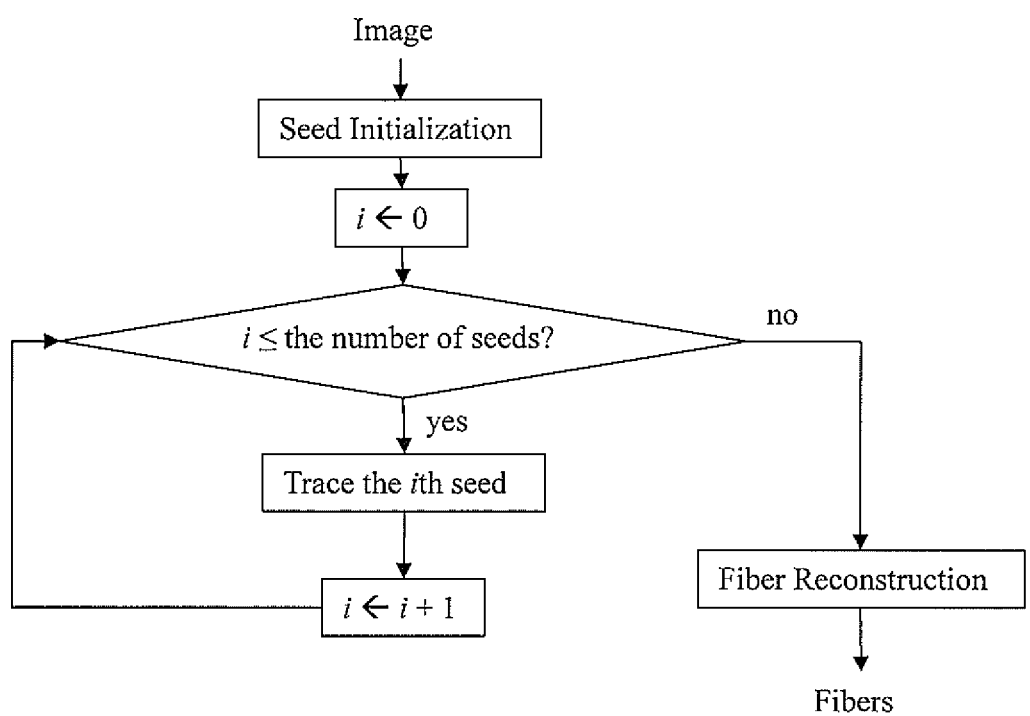
FIG. 4 is a flowchart of conventional method steps for tracing seed candidates.

FIG. 4 depicts a flowchart comprising steps of conventional method for tracing seed candidates within an image of fiber contained biological samples. This method allows for identification of seeds candidate where each seed is followed with progressive fitting.

Figure 5:
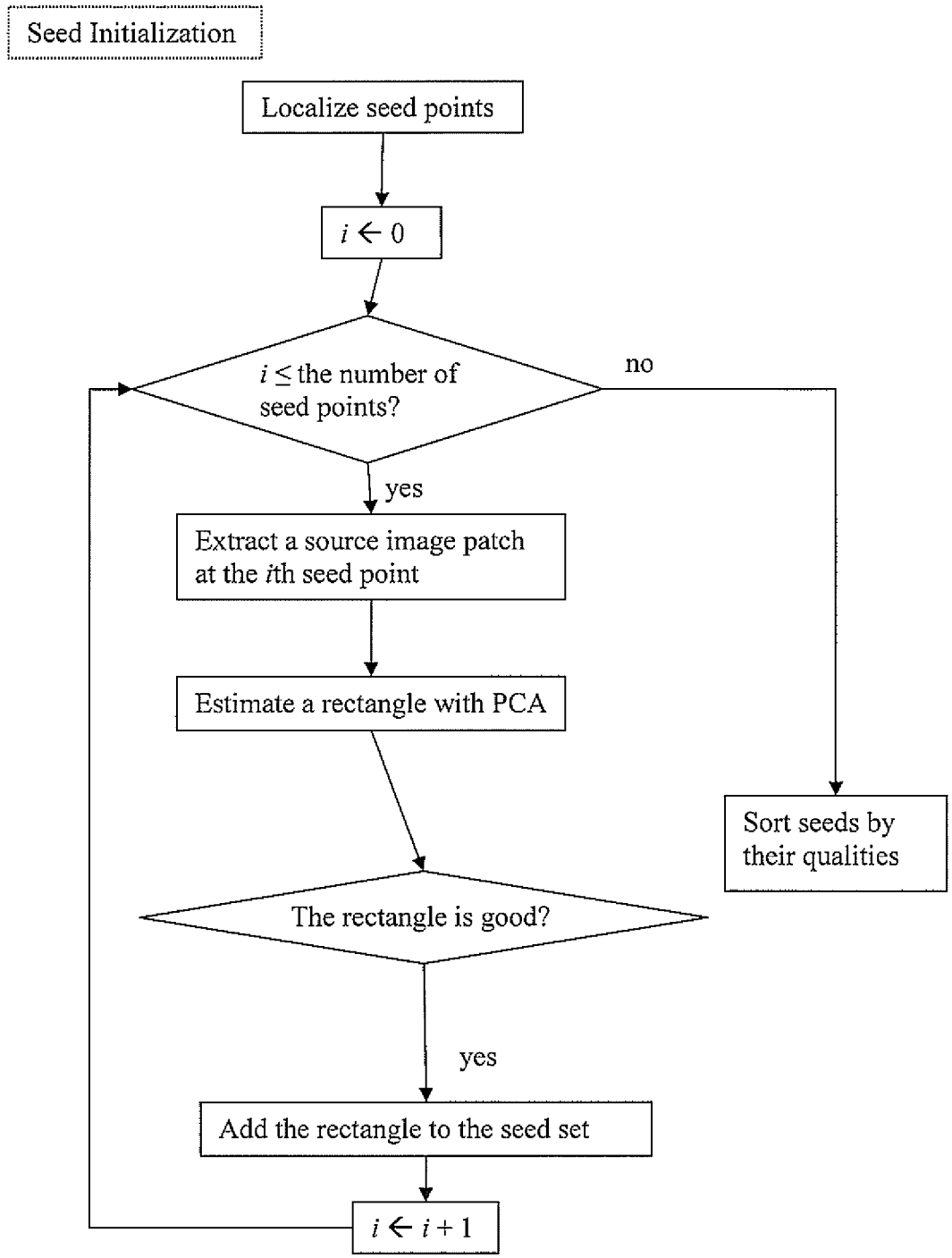
FIG. 5 is a flowchart of seed initialization according to the computer-implemented method of the present invention.
Figure 6:
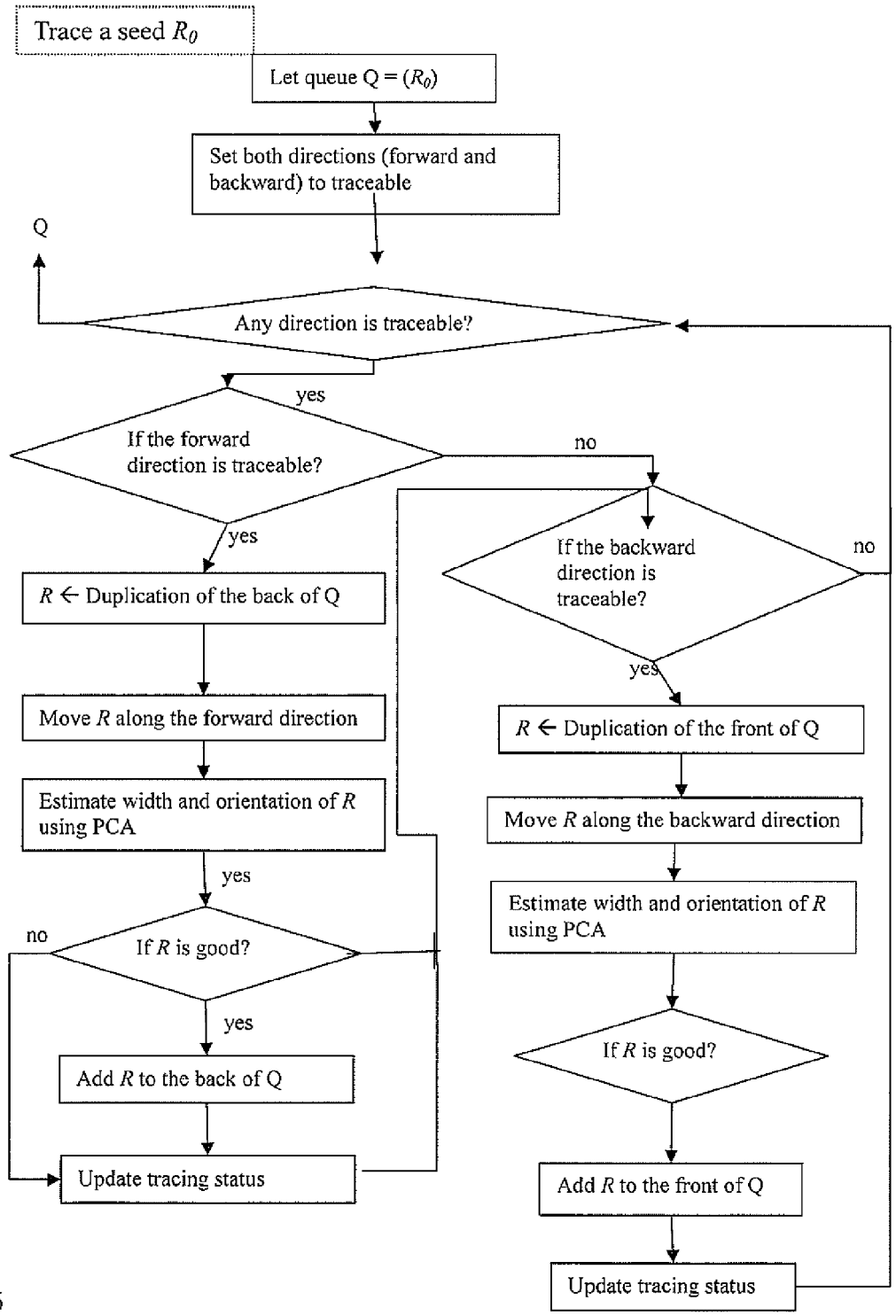
FIG. 6 is a flowchart of tracing a seed according to the computer-implemented method of the present invention.

FIGS. 5 and 6 present a detailed description of steps for seed initialization and tracing procedures. According to the present invention both procedures employ PCA which substantially reducing the time for obtaining the set of individual fiber fragments that can be assembled to form the individual fiber object or tree structure.

Figure 7A:
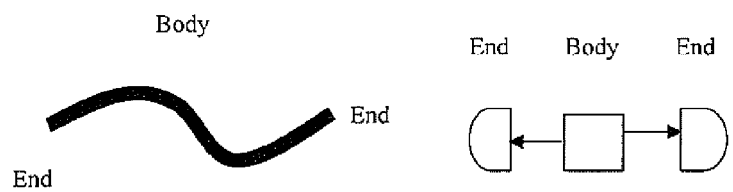
FIG. 7A is a graph representation of a fiber segment connection.
Figure 7B:
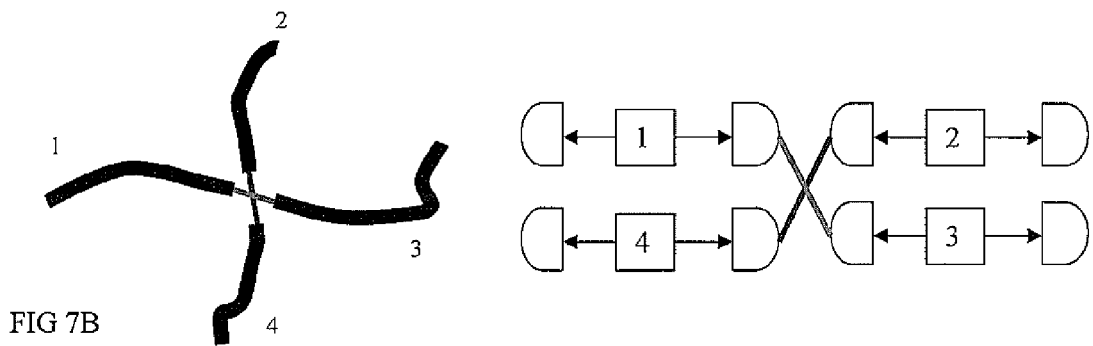
FIG. 7B is a graph representation of a fiber crossing defining end-to-end connection of a fiber segment
Figure 7C:
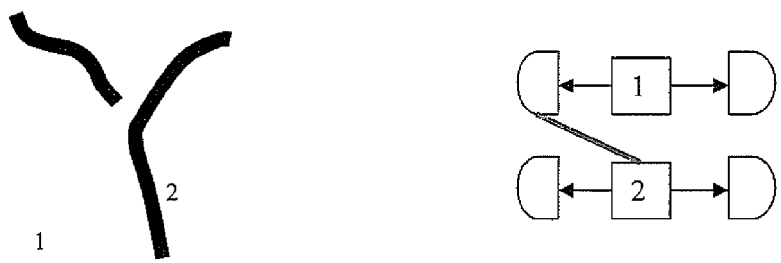
FIG. 7C is a graph representation of a fiber branch defining body-to-body connection of the fiber segment.

FIGS. 7A through 7C show the examples of graph representations of fiber segment connections. In FIG. 7, as shown, a body of an exemplary fiber comprises two ends by which connection to neighboring fibers are provided. FIG. 7B shows a fiber cross defining as end to end connection of fiber segments 1,2,3,4. Fiber cross connection graph representation is defined as end-to-end connection of fiber segments. The term "island" is used to refer to a graph consisting of end-to-end connection. With reference to FIG. 7C a fiber branch is shown connecting segments 1 and 2. This connection is defined as a body-to-body connection.

Figure 8:
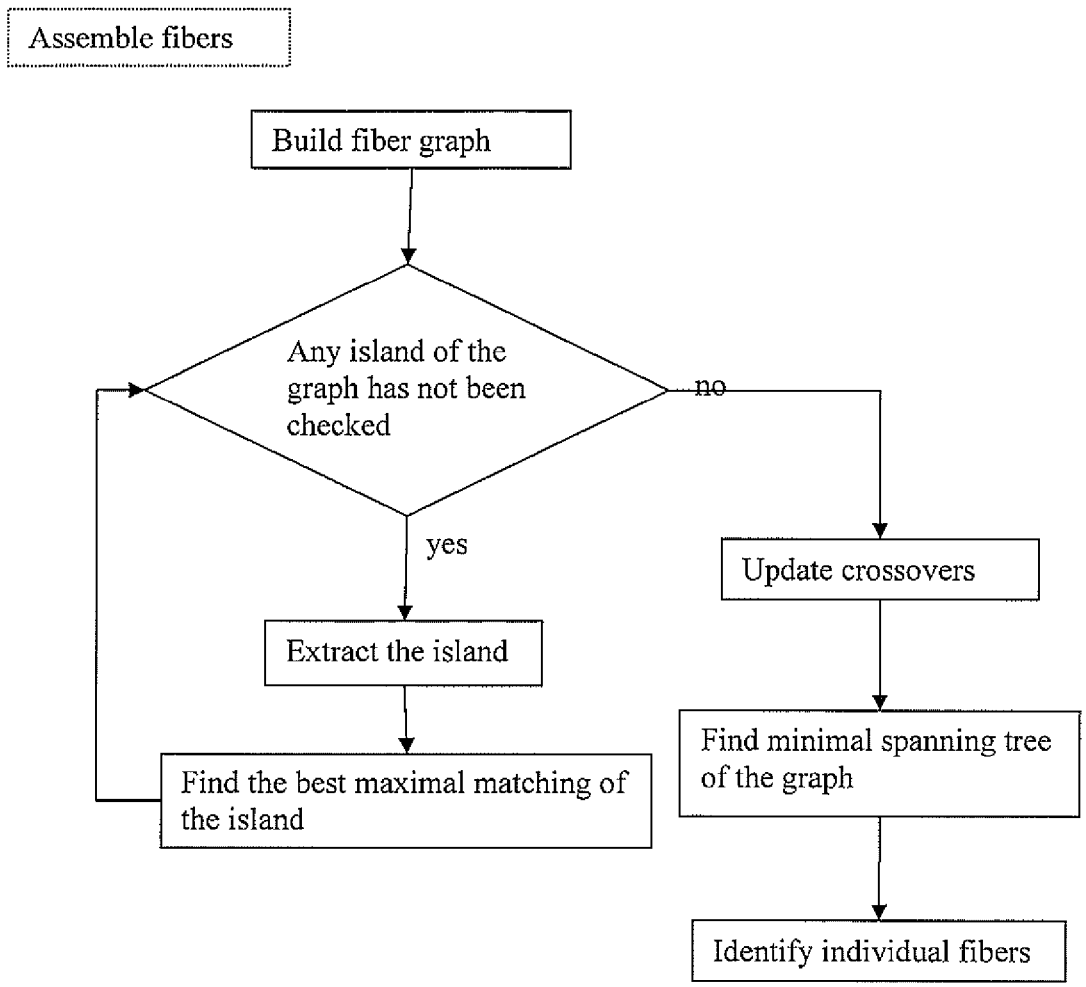
FIG. 8 is a flowchart of a fiber assembling procedure according to the computer-implemented method of the present invention.

To address the image crossovers, the fiber segments are connected in a graph, in which the weight of each edge is characterized by a function of the angle and distance of the connected segments. An enumeration matching algorithm is applied to find the maximal match that comprises the maximum sum of matching weights The fiber assembling process is shown, in a flow chart of FIG. 8. The fiber graph is built by selecting any unexamined island of the graph, extracting it and matching with the maximally matching island; and repeating the procedure until all the islands of interest are examined. After none of the unexamined islands left, the crossovers are updated and minimal spanning tree of the graph is defined for further identification of individual fibers.

The present invention as described herein allows for accurate measurement of fiber morphology as for example, length, width, branches and provides accurate fiber cross identification for different fiber-contained images of the samples.

What is claimed is:

1. A computer-implemented method of analyzing fibers and branching structures of objects, the computer-implemented method comprising:
    obtaining an image of an object utilizing an imaging device, the object comprising fibers and/or branching structures;
    obtaining initial tracing seeds using adaptive thresholding method;

identifying tracing seeds candidates by employing local Principal Component Analysis (PCA) calculation;

removing the seeds having low score from the initial calculation;

tracing a single fiber segment utilizing a fiber detection and a fiber tracing modules;

assembling individual fiber segments utilizing a connectivity module; and forming and analyzing final fiber structures.

2. The computer-implemented method of claim 1, wherein identifying tracing seeds candidate further comprises selecting seeds matching the best to fiber distinguishable characteristics within a surrounding area and having highest signal to noise.

3. The computer-implemented method of claim 2, wherein the fiber distinguishable characteristics comprise shape, intensity or color.

4. The computer-implemented method of claim 2, wherein performing the single fiber segment tracing comprises:

calculating the best rectangle which matches local fiber image at the given location; growing the rectangle by moving the seed along a rectangle axis direction; and performing next PCA fitting calculation.

5. The computer implemented method of claim 4, further comprising repeating the signal fiber segment tracing for each selected seed candidate.

6. The computer implemented method of claim 5, further comprising providing fiber segment connection by performing crossover matching calculation.

7. The computer-implemented method of claim 6, wherein the individual fiber segments are connected together based on their proximity, similarity and rules of connectivity.

8. The computer-implemented method of claim 6, wherein a fiber crossing comprises four bodies and five ends.

9. The computer-implemented method of claim 6, wherein the fiber branch structure comprises two bodies and three ends.

10. The computer-implemented method of claim 6, wherein the fiber assembling comprises building a fiber graph by selecting any unexamined island of the graph;

extracting an unexamined island and matching with a maximally matching island;

examining all the islands of interest by repeating the procedure; and updating the crossovers of the fibers and defining a minimal spanning tree of the graph.

11. The computer-implemented method of claim 4, wherein the individual fiber segment comprises a body and a pair of fiber ends.

12. The computer-implemented method of claim 1, further comprising obtaining and utilizing a second image containing a cellular nuclei in a field of view to assist in the identification of cell bodies.

13. The computer-implemented method of claim 1, further comprising identifying neuronal spines using the same or secondary image by relating the spines to neurites through proximity or connectivity to individual neurites sections and to a parent neuron.

* * * * *